(12) United States Patent
Ganapathiappan et al.

(10) Patent No.: US 8,857,964 B2
(45) Date of Patent: *Oct. 14, 2014

(54) INKJET INK COMPOSITION INCLUDING LATEX POLYMERS

(75) Inventors: Sivapackia Ganapathiappan, Los Altos, CA (US); Howard S. Tom, San Jose, CA (US); Hou T. Ng, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 437 days.

This patent is subject to a terminal disclaimer.

(21) Appl. No.: 13/262,801

(22) PCT Filed: Apr. 13, 2009

(86) PCT No.: PCT/US2009/040394

§ 371 (c)(1),
(2), (4) Date: Oct. 3, 2011

(87) PCT Pub. No.: WO2010/120278

PCT Pub. Date: Oct. 21, 2010

(65) Prior Publication Data

US 2012/0026238 A1 Feb. 2, 2012

(51) Int. Cl.
*B41J 2/01* (2006.01)
*C09D 11/322* (2014.01)
*B41J 2/21* (2006.01)
*C09D 11/30* (2014.01)

(52) U.S. Cl.
CPC .............. *C09D 11/322* (2013.01); *B41J 2/01* (2013.01); *B41J 2/2107* (2013.01); *C09D 11/30* (2013.01)
USPC .............................. 347/100; 347/95; 523/160

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101

USPC ............ 347/100, 95, 9, 96, 102, 105, 88, 99, 347/103; 106/31.6, 31.13, 31.27; 523/160, 523/161
See application file for complete search history.

(56) References Cited

U.S. PATENT DOCUMENTS 5,852,074 A 12/1998 Tsutsumi et al.
6,858,301 B2 2/2005 Ganapathiappan
(Continued)

FOREIGN PATENT DOCUMENTS

CN 1487042 4/2004
CN 1636727 7/2005
(Continued)

OTHER PUBLICATIONS

Supplementary European Search Report for application PCT/US2009/040394 dated Nov. 22, 2013 (11 pages).

*Primary Examiner* — Manish S Shah

(57) ABSTRACT

An inkjet ink composition includes latex polymer particles. The latex polymer particles are present in the ink composition in an amount ranging from about 0.5 wt % to about 40 wt %. The latex polymer particles have: a $T_g$ ranging from about −40° C. to about 125° C.; and up to about 100% of total cross-linkable sites being present: on surfaces of the latex polymer particles; throughout a bulk of the latex polymer particles; or combinations thereof. The latex polymer particles are formed from monomers including at least one hydrophobic monomer, at least one acidic monomer, and at least one crosslinkable monomer, the at least one crosslinkable monomer including at least one keto group. The ink composition further includes at least one cross-linker compound selected from the group consisting of diamino compounds, polyamino compounds, and combinations thereof. Yet further, the ink composition includes at least one colorant and at least one aqueous solvent. The latex polymer particles are configured to form a crosslinked latex polymer film as and/or after the aqueous solvent is depleted from the latex polymer particles after the ink composition is applied by inkjet printing onto a medium.

16 Claims, 2 Drawing Sheets

(56) References Cited

U.S. PATENT DOCUMENTS

| | | |
|---|---|---|
| 6,995,206 B2 | 2/2006 | Zhou |
| 7,264,920 B2 | 9/2007 | Ohzeki |
| 7,275,818 B2 | 10/2007 | Figov |
| 7,416,297 B2 | 8/2008 | Figov |
| 7,425,062 B2 | 9/2008 | Bauer |
| 7,442,723 B2 | 10/2008 | Bauer |
| 2002/0025994 A1 | 2/2002 | Ishizuka et al. |
| 2004/0063807 A1 | 4/2004 | Wang et al. |
| 2004/0063809 A1 | 4/2004 | Fu et al. |
| 2004/0157957 A1 | 8/2004 | Ganapathiappan et al. |
| 2006/0199877 A1* | 9/2006 | Ganapathiappan ............ 523/160 |
| 2007/0211126 A1* | 9/2007 | Bauer et al. .................... 347/100 |
| 2011/0196084 A1* | 8/2011 | Nabuurs et al. ................ 524/458 |

FOREIGN PATENT DOCUMENTS

| | | |
|---|---|---|
| JP | 55139471 | 10/1980 |
| JP | 2002088215 | 3/2002 |
| JP | 2006045334 | 2/2006 |
| JP | 2007152149 | 6/2007 |
| WO | WO 99/14275 | 3/1999 |
| WO | WO 03/006561 | 1/2003 |

* cited by examiner excellent highlighter smearfastness, rub resistance, wet smudgefastness, and solvent resistance (e.g., as represented by the window cleaner test described below). Generally, rub resistance and window cleaner tests are more aggressive tests, as compared to, e.g., the highlighter smearfastness and wet smudgefastness tests. The solvent used in the window cleaner test is more aggressive than highlighter fluid, and the rub resistance test uses a more abrasive material than a highlighter tip. As such, inkjet inks exhibiting better performance in the window cleaner and rub resistance tests should exhibit better performance in the highlighter smearfastness and wet smudgefastness tests.

INKJET INK COMPOSITION INCLUDING LATEX POLYMERS

CROSS REFERENCE TO RELATED APPLICATIONS

This application is the U.S. National Phase application of PCT International Application No. PCT/US09/40394, filed Apr. 13, 2009, the disclosures of this application being incorporated herein by reference in their entireties for all purposes.

BACKGROUND

The present disclosure relates generally to polymers used to improve the durability of inkjet printed inks. Polymers are used to improve the durability of printouts using a variety of printing techniques. A typical example is the dry toner used in commercial printers. However, use of such polymers is generally difficult in water-based inkjet inks due to the water-like viscosity of inkjet inks.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
FIG. 1 is a photograph of the result of a dry rub test of a control ink sample described in Example 2.

It is technically challenging to have polymers remain dispersed in inkjet inks while still being able to form a print film after printing. To overcome this problem, latex polymers may be used, as they generally have suitably low viscosities with a higher amount of solids content. However, the durability of printed ink images in such systems has sometimes been lacking, as compared to printed images from electrophotography or UV-based technologies. The fact that aqueous inks suitable for inkjet printing often include ink vehicles in an amount greater than about 15% of the total ink volume may contribute to these durability concerns.

Lately, chemical fixers or bonding agents have been used to improve waterfastness in inkjet inks. However, in some instances, such curing systems may not exhibit the desired improvement in rub resistance, although they may improve highlighter fastness. New polymers, additives or process conditions are desirable to achieve such goals in inkjet applications. Polymers that conformably form a film while protecting the colorant are required. Furthermore, the film formed needs to sufficiently withstand rubbing or other mechanical and chemical forces. Polymers commonly found in inkjet inks have generally not been required to withstand such strong forces. Previous work has concentrated on intra-particle cross-linking to achieve shear stability.

However, the present inventors have discovered that such an emphasis does not achieve improved rub resistance. It is believed that this is because intra-particle cross linking does not improve the poor intermixing of particles during the polymer coalescence that maintains boundary conditions of the film. On the other hand, the present inventors have discovered that inter-particle interaction advantageously increases the overall toughness of the film, e.g., the rub resistance, while intra-particle interaction does not.

The instant application relates to the improvement in durability of inkjet inks. These durability improvements encompass: excellent highlighter smearfastness, rub resistance, wet smudgefastness, and solvent resistance (e.g., as represented by the window cleaner test described below). Generally, rub resistance and window cleaner tests are more aggressive tests, as compared to, e.g., the highlighter smearfastness and wet smudgefastness tests. The solvent used in the window cleaner test is more aggressive than highlighter fluid, and the rub resistance test uses a more abrasive material than a highlighter tip. As such, inkjet inks exhibiting better performance in the window cleaner and rub resistance tests should exhibit better performance in the highlighter smearfastness and wet smudgefastness tests.

Without being bound to any theory, it is believed that the increased durability discussed herein is achieved by cross-linking of latex polymer particles that takes place after inkjet printing while the aqueous solvent vehicle in the ink is being depleted, and after its elimination through evaporation and absorption. While a cross-linker compound may be present in the inkjet ink composition at the time of printing, the present inventors have found that it does not react with the latex polymer particles in the non-printed ink. This is mostly due to the fact that it has been found that the cross-linker compound reacts poorly with the latex polymer particles in the presence of the aqueous medium.

Further, the presence of humectants in the inkjet ink composition generally prevents nozzle-clogging as a result of such a combination of components in the ink.

Latex polymer particles according to embodiment(s) of the present disclosure are prepared by emulsion polymerization techniques such as batch, semi-batch or mini-emulsion processes. Such polymer particles may be produced using hydrophobic monomers and acidic monomers, along with at least one crosslinkable monomer.

The hydrophobic monomer(s) can be present in an amount up to about 98 wt % of the monomers forming the latex polymer particles. In alternate embodiments, the hydrophobic monomer(s) may be present in an amount ranging from about 70 wt % to about 98 wt %, or from about 80 wt % to about 98 wt % of the monomers forming the latex polymer particles. Non-limiting examples of suitable hydrophobic monomers are methyl methacrylate, ethyl methacrylate, propyl methacrylate, butyl methacrylate, hexyl methacrylate, 2-ethylhexyl methacrylate, lauryl methacrylate, octadecyl methacrylate, isobornyl methacrylate, vinyl acetate, methyl acrylate, ethyl acrylate, propyl acrylate, butyl acrylate, hexyl acrylate, 2-ethylhexyl acrylate, lauryl acrylate, octadecyl acrylate, isobornyl acrylate, styrene, and combinations thereof. In the above examples, it is to be understood that methacrylates can be replaced with their corresponding acrylates. Mixtures of the monomers can be used to adjust the $T_g$ of the composite latex polymer particles and the effectiveness of the printed inkjet ink film.

The acidic monomer(s) can be present in an amount ranging from about 0.1 wt % to about 30 wt % of the monomers. In alternate embodiments, the acidic monomer(s) can be present in an amount ranging from about 0.1 wt % to about 20 wt %, or from about 0.5 wt % to about 5 wt % of the monomers. The acidic monomer(s) may advantageously provide for desired stability of the latex polymer particles in water by incorporating charges to the particles. Normally, printability may be poor without these monomers. The charge can be further enhanced by raising the pH of the medium so that the —COOH groups can be converted to the salt form. Non-limiting examples of suitable acid-containing monomers include acrylic acid, methacrylic acid, itaconic acid, maleic acid, vinyl benzoic acid, or combinations thereof, or derivatives thereof.

At least one crosslinkable monomer can be present in an amount ranging from about 0.1 wt % to about 25 wt % of the monomers. In alternate embodiments, the crosslinkable monomer(s) may be present in an amount ranging from about 0.2 wt % to about 10 wt %, or from about 0.2 wt % to about 1 wt % of the monomers. The crosslinkable monomer(s) may be selected from suitable cross-linker interactive monomers.

Cross-linker interactive monomers are monomers having moieties configured to react with the cross-linker compound(s) in the ink composition. In an embodiment, suitable cross-linker interactive monomers include those with keto groups. The general structure for the cross-linker interactive monomer is the following:

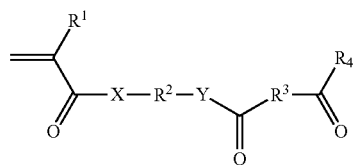

where:

R1=H or CH$_3$;

X═Y=a divalent hetero atom linking group, e.g. O, NH, S or just a bond;

R2=R3=a divalent linking group, e.g. alkylene (CH$_2$CH$_2$) or arylene; and

R4=an alkyl, aryl or substituted alkyl/aryl group.

Non-limiting examples of such cross-linker interactive monomers include 2-(methacryloyloxy)ethyl acetoacetate:

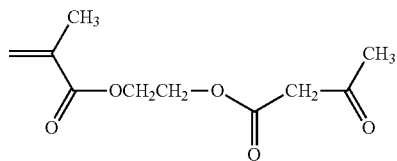

and diacetone acrylamide:

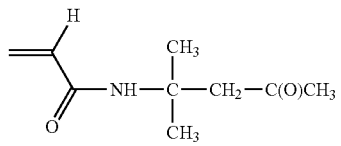

When cross-linker initiated (interactive) cross-linking takes place as a result of the aqueous solvent vehicle being depleted and eliminated in the ink, the post cross-linked inkjet ink film print that forms will be stronger.

Furthermore, from about 40% to about 100% of total cross-linkable sites may be present exclusively on the surface of the latex polymer particles. The availability of the cross-linkable sites at the surface (and thus available for cross-linking interaction) generally depends upon when in the process (vis-à-vis other monomer(s) addition) and how much of the cross-linker interactive monomer (again, relative to other monomer(s) addition) is added. For example, the cross-linkable monomer, if added along with other monomers, may be present almost uniformly throughout the latex polymer particles and on the surfaces thereof. In this case, the amount of these units available for cross-linking will be less since they are present throughout the polymer particles. On the other hand, if the cross-linkable monomer is added after addition of other monomers, then almost all of the cross-linkable monomer (e.g., ~100%) will be on the polymer particles' surfaces. At the same time, if the same cross-linkable monomer is added after addition of ~60% of other non-keto containing monomers, then the cross-linkable monomer present on the polymer particles surfaces may be ~40%.

As such, it is to be understood that up to about 100% of total cross-linkable sites may be present on the surface of the latex polymer particles, throughout the bulk of the latex polymer particles, or on/throughout combinations thereof. As used herein, the "throughout the bulk of the latex polymer particles" is intended to mean that the keto group-containing monomer (i.e. the cross-linkable monomer) presents itself throughout the latex polymer particle. As mentioned above, when the cross-linkable monomer is within (as opposed to on the surface of) the latex polymer particles, the cross-linking sites on those monomer(s) are generally not available for cross-linking.

In addition, reactive surfactants may be used to further enhance the film forming ability and to increase the stability of the particles. It is to be understood that any suitable reactive surfactants may be used. Some non-limiting examples of reactive surfactants include Hitenol™ (polyoxyethylene alkylphenyl ether ammonium sulfate) and Noigen™ (polyoxyethylene alkylphenyl ether) reactive surfactants commercially available from Dai-Ichi Kogyo Seiyaku Co., Ltd. of Japan; TREM™ sulfosuccinates commercially available from Henkel; and the Maxemul™ (anionic phosphate ester) reactive surfactants commercially available from Uniqema of The Netherlands. Suitable grades of some of the materials listed above may include Hitenol BC-20, Noizen RN-30, TREM LT-40, and Maxemul 6106 and 6112.

When a cross-linker compound is included in the inkjet ink composition, these compounds are configured to (during and/or after printing of the ink) react with the cross-linkable moieties of the cross-linker interactive monomers. Suitable examples of the cross-linker compound include, but are not limited to, compounds containing diamino groups such as adipic acid dihydrazide, ethylene diamine, propylene diamine, or combinations thereof. It is to be understood that further examples of the cross-linker compound include other compounds containing di- or poly-amino groups containing either primary or secondary amino groups. Some non-limiting examples of suitable polyamino compounds include ethylenediamine; diethylenetriamine; triethylenetetramine; propylenediamine; polyethyleneimine having a molecular weight from about 400 to about 500,000; and combinations thereof.

It is to be understood that the cross-linker compound may be present in the ink composition in an amount ranging from about 1 mole % to about 100 mole % with respect to the total cross-linkable sites. In an alternate embodiment, the cross-linker compound may be present in the ink composition in an amount ranging from about 20 mole % to about 50 mole % with respect to the total cross-linkable sites.

In an embodiment of the present disclosure, the $T_g$ of the latex polymer particles may range from about −40° C. to about +125° C.; in another embodiment from about 0° C. to about 75° C.; and in yet another embodiment from about 35° C. to about 75° C.

Further, in an embodiment of the present disclosure, the amount of latex polymer particles can be present in the ink composition in an amount ranging from about 0.5 wt % to about 40 wt %; in another embodiment from about 0.5 wt % to about 20 wt %; in a further embodiment from about 2 wt % to about 6 wt %; in a further embodiment from about 1 wt % to about 15 wt %; and in yet another embodiment from about 1 wt % to about 10 wt %.

The latex polymer particles as described herein are included in the inkjet ink composition according to embodiment(s) of the present disclosure.

The inkjet ink composition further includes pigment(s) of one or more colorants dispersed in at least one suitable aqueous solvent.

Examples of suitable colorants include, but are not limited to commercial pigments available from companies such as Cabot, Clariant, Degussa, DIC, BASF, CIBA and Orient. A few non-limiting examples of suitable colorants include Cabojet 200 and 300, commercially available from Cabot Corporation in Billerica, Mass.

Examples of suitable aqueous solvents include, but are not limited to water, 2-pyrrolidone, N-methylpyrrolidone, primary and secondary alcohols such as 1,2-pentanediol, 1,2-hexanediol, and 1,6-hexanediol, and combinations thereof.

Other additives may be added to the inkjet ink composition according to embodiment(s) of the present disclosure. Some examples of such additives include, but are not limited to ethylenediamine tetraacetic acid (EDTA), other pH adjusting chemicals, biocides, humectants, and combinations thereof.

Embodiment(s) of the inkjet ink composition of the present disclosure may be suitable for use on many types of media, including but not limited to vinyl media, cellulose-based paper media (coated or not), various cloth materials, polymeric materials (non-limitative examples of which include polyester white film or polyester transparent film), photopaper (non-limitative examples of which include polyethylene or polypropylene extruded on one or both sides of paper), metals, and/or mixtures thereof. A non-limitative example of a suitable metal material is a metal in foil form made from for example, at least one of aluminum, silver, tin, copper, alloys thereof, and/or mixtures thereof.

Figure 5:
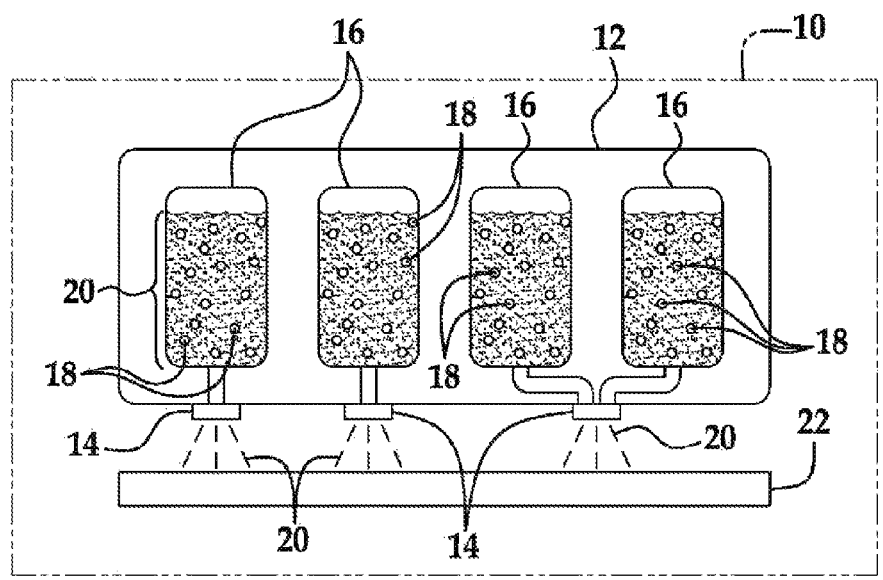
FIG. 5 is a semi-schematic view of an inkjet printing system according to an embodiment of the present disclosure.
Figure 6:
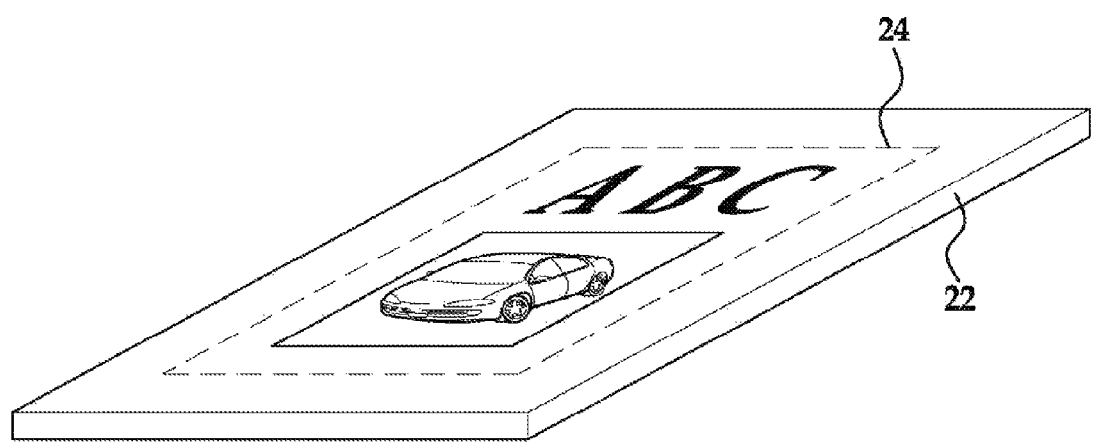
FIG. 6 is an enlarged perspective view of a medium having an inkjet ink print thereon according to an embodiment of the present disclosure.

Referring now to FIGS. 5 and 6, an inkjet printing system according to an embodiment of the present disclosure is designated at reference numeral 10. The system 10 includes an inkjet printing device 12 having one or more inkjet fluid ejectors 14, each fluidically coupled to one or more reservoirs 16. The reservoir(s) 16 contain desired embodiment(s) of the inkjet ink composition 20 of the present disclosure. The latex polymer particles 18 are depicted schematically within the ink 20. It is to be understood that the printing device 12 may be any of a continuous device, a drop-on-demand device, a thermal inkjet (TIJ) device, or a piezoelectric inkjet device.

The fluid ejector(s) 14 is/are configured to eject the ink composition 20 onto a medium 22. As discussed above, the ink composition 20 on the medium 22 is configured to form a solvent-depleted, cross-linked latex polymer film 24 as and/or after the aqueous solvent is depleted from the latex polymer particles 18 after printing.

It is to be understood that the higher the heat used in the printing device, the shorter the time for drying the printed film 24. The crosslinking may begin substantially immediately upon printing, e.g., a few seconds after printing as the solvent begins to evaporate. It is to be further understood that the crosslinking generally continues to occur, for a time period ranging from about 2 seconds to about 24 hours. In an embodiment, this time period ranges from about 2 seconds to about 2 hours.

Durability may be enhanced further as the film 24 dries more (i.e. has further solvent evaporated therefrom). For example, films 24 that are dry to the touch after, e.g., 30 seconds, and exhibit increased durability upon testing as described herein, may exhibit yet further improved results after further drying, e.g., after several hours to a day.

The inkjet inks of the present disclosure exhibit enhanced durability. These durability improvements may be exhibited in various ways, e.g., excellent highlighter smearfastness, rub resistance, wet smudgefastness, and solvent resistance. Durability comparisons are made by ascertaining differences visible to the naked eye. After printing, the printed area may be tested by various tests, including those mentioned herein. If more white spots are observed, then more printed material is lost. This signifies poor durability. Improved durability inks exhibit less formation of white spots, thereby less loss of printed material after testing. A numeric scale may be used from 1 to 5, with 1 having no loss of ink or damage to the printed surface. A value of 5 would have the entire printed material wiped or rubbed away, leaving exposed the media surface upon which the ink was printed.

To further illustrate the embodiment(s) of the present disclosure, examples are given herein. It is to be understood that these examples are provided for illustrative purposes and are not to be construed as limiting the scope of the disclosed embodiment(s).

The embodiments of the inks below were tested on a prototype printer made by Hewlett-Packard for evaluation purposes using different kinds of media. In the examples below, the results of printing on vinyl media are reported. Vinyl media is commercial media made from polyvinyl chloride) type materials, and does not contain cellulose as found in plain paper.

EXAMPLES

Example 1

Synthesis of Cross-Linkable Latex Polymer

The monomers styrene (300 g), butyl acrylate (72 g) and methacrylic acid (8 g) were emulsified in water (136 ml) containing reactive surfactant MAXEMUL 61066® (1.6 g) available from Uniqema. Water (1160 ml) was heated to 90° C. Meanwhile, an initiator solution was prepared by dissolving potassium persulfate (1.39 g) in water (160 ml). Then, 32 ml of the initiator solution was added to hot water followed by the simultaneous addition of the remaining initiator solution and emulsion. When 80% of the emulsion was added, 2-(methacryloyloxy)ethyl acetoacetate (20 g) was mixed with the emulsion, and the addition was continued so that acetoacetate groups were on the surface of the latex. Emulsion addition took 33 minutes, while the initiator addition took 32 minutes. The reaction mixture was maintained at a temperature of about 90° C. for a period of about 2.5 hours and then cooled to ambient temperature. The pH of the latex formed was then adjusted to 8.5 with 50% potassium hydroxide solution. It was filtered to obtain the latex in the form of about 20.8% solid.

Example 2

Synthesis of Non-Cross-Linkable Latex as Control

The experiment in Example 1 was repeated, but the 2-(methacryloyloxy)ethyl acetoacetate monomer was eliminated, and a larger amount (320 g) of styrene was added. The result was latex made under similar conditions to Example 1, but without cross-linkable sites.

Example 3

Cross-Linkable Latex with Added Cross-Linker

Latex from Example 1 was mixed with 10% adipic acid dihydrazide in an amount half the molar quantity of the 2-(methacryloyloxy)ethyl acetoacetate present in the latex.

Example 4

Preparation of Ink with Cross-Linkable Latex Polymer Particles

An ink-jettable coating composition was prepared by dispersing 6 weight % solid of the composition of Example 3 in a liquid vehicle. A second ink-jettable coating composition was prepared for comparison by dispersing 6 weight % solid of the composition of Example 2 in a liquid vehicle/solvent. The liquid vehicles each included 20 wt % organic co-solvent, 0.5 wt % surfactant, and 0.5 wt % biocide, with the balance being water. In addition, the cross-linker adipic acid dihydrazide that had been added in Example 3 was added in an amount such that sufficient durability was achieved. This amount was also the amount required for 2-(methacryloyloxy)ethyl acetoacetate to react fully (approximately 50% in this case). Each ink also contained about 3% of pigments to impart color. For comparison purposes, the second ink was tested with similar latex polymer particles, but did not have cross-linkable monomers or a cross-linker compound.

Alternative ways that the adipic acid dihydrazide could be added are as follows: adding solid adipic acid dihydrazide to the ink solution; adding solid adipic acid dihydrazide with latex to the ink solution; dissolving adipic acid dihydrazide in water and mixing with ink; or dissolving the adipic acid dihydrazide in water, mixing it with latex and adding that mixture to ink.

Example 5

Dry Rub Test Results

The above-described inks were filled into inkjet pens and printed with a Hewlett-Packard® printer. They were printed on vinyl media. Printed samples from Examples 2 and 3, specifically a control from Example 2 and a sample made according to Example 3, were submitted to a rub test.

The dry rub test was performed with a linear abraser (specifically a Taber® Linear Abraser-Model 5750). The arm of the linear abraser stroked each media sample in a linear motion back and forth at a controlled stroke speed and length, the head of the linear abraser following the contours of the media samples. To the shaft of the arm of the linear abraser, a 250 gram weight was added to make the load constant. Specifically for the rub test, a stroking head or "wearaser" was attached to the end of the arm of the linear abraser. The stroking head was the size and shape of a pencil eraser and had a contact patch with a diameter of approximately ¼ inch diameter. The stroking head was abrasive (specifically Calibrase® CS-10) with a mild to medium abrasive effect. The stroking head was stroked back and forth 10 times on each media sample. The rubbed media samples were judged for color fastness.

Figure 3:
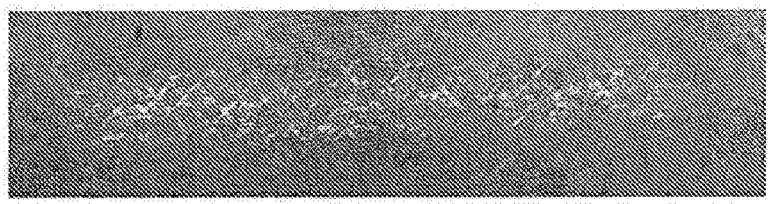
FIG. 3 is a photograph of the result of a dry rub test of an ink described in Example 3 according to an embodiment of the disclosure.

Poor dry rub test results were obtained for the control ink sample from Example 2, as shown in FIG. 1, which upon visual examination, exhibits that print material has been lost, and white spots are observed. This test result was assigned a relative ranking of 3. Good dry rub test results were obtained for the sample made according to Example 3, as shown in FIG. 3, which upon visual examination, exhibits less print material lost, resulting in fewer white spots as compared to the control example. This test result was assigned a relative ranking of 2.

Example 6

Window Cleaner Test Results

The above-described inks were filled into inkjet pens and printed with a Hewlett-Packard® printer. They were printed on vinyl media. A printed sample of the control of Example 2 and a sample made according to Example 3 were submitted to a window cleaner/solvent test.

The window cleaner test was performed with a linear abraser (specifically a Taber® Linear Abraser-Model 5750). The arm of the linear abraser stroked each media sample in a linear motion back and forth at a controlled stroke speed and length, the head of the linear abraser following the contours of the media samples. To the shaft of the arm of the linear abraser, a 250 gram weight was added to make the load constant. Specifically for the window cleaner test, an acrylic finger (specifically from a Taber® Crock Meter Kit) covered by a cloth (specifically a Taber® Crocking Cloth) was attached to the end of the arm of the linear abraser. Windex® window cleaner was applied to the cloth, and the cloth-covered end of the acrylic finger was stroked back and forth 5 times on each media sample. The rubbed media samples were judged for color fastness.

Figure 2:
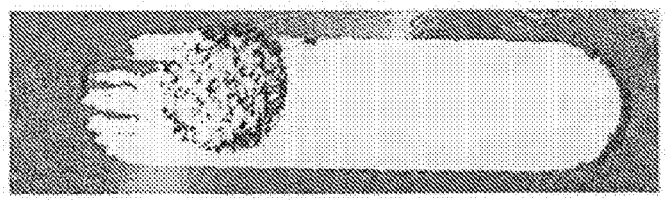
FIG. 2 is a photograph of the result of a window cleaner test of a control ink sample described in Example 2.
Figure 4:
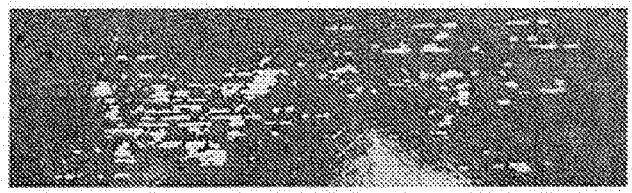
FIG. 4 is a photograph of the result of a window cleaner test of an ink described in Example 3 according to an embodiment of the disclosure.

Poor window cleaner test results were obtained with the control ink from Example 2, as shown in FIG. 2, which upon visual examination, exhibits that most of the print material has been lost, and many white spots are observed. This test result was assigned a relative ranking of 5. Good results were obtained when the sample made according to Example 3 was submitted to a window cleaner test, as shown in FIG. 4, which upon visual examination, exhibits less loss of print material, and fewer white spots observed, as compared to the control sample. This test result was assigned a relative ranking of 2.

While several embodiments have been described in detail, it will be apparent to those skilled in the art that the disclosed embodiments may be modified. Therefore, the foregoing description is to be considered exemplary rather than limiting.

What is claimed is:

1. An inkjet ink composition, comprising:
   latex polymer particles present in the ink composition in an amount ranging from about 0.5 wt % to about 40 wt %, the latex polymer particles having:
   a $T_g$ ranging from about −40° C. to about 125° C.; and
   up to about 100% of total cross-linkable sites being present: on surfaces of the latex polymer particles; throughout a bulk of the latex polymer particles; or combinations thereof;
   the latex polymer particles being formed from monomers consisting of at least one hydrophobic monomer selected from the group consisting of methyl methacrylate, ethyl methacrylate, propyl methacrylate, butyl methacrylate, hexyl methacrylate, 2-ethylhexyl methacrylate, lauryl methacrylate, octadecyl methacrylate, isobornyl methacrylate, vinyl acetate, methyl acrylate, ethyl acrylate, propyl acrylate, butyl acrylate, hexyl acrylate, 2-ethylhexyl acrylate, lauryl acrylate, octadecyl acrylate, isobornyl acrylate, styrene, and combinations thereof, at least one acidic monomer selected from the group consisting of acrylic acid, methacrylic acid, itaconic acid, maleic acid, vinyl benzoic acid, derivatives thereof, and combinations thereof, and at least one crosslinkable monomer, the at least one crosslinkable monomer including at least one keto group, and having the general formula

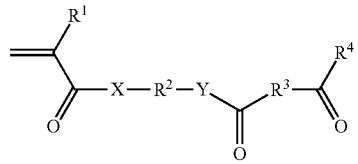

where:
   R1=H or $CH_3$;
   X=Y=a divalent hetero atom linking group or a bond;
   R2=R3=a divalent linking group; and
   R4=an alkyl, aryl, substituted alkyl group or substituted aryl group;
   at least one cross-linker compound selected from the group consisting of diamino compounds, polyamino compounds, and combinations thereof;
   at least one colorant; and
   at least one aqueous solvent;
   wherein the latex polymer particles are configured to form a crosslinked latex polymer film by interaction with the at least one cross-linker compound at least one of during or after depletion of the at least one aqueous solvent from the latex polymer particles after the ink composition is applied by inkjet printing onto a medium.

2. The inkjet ink composition of claim 1 wherein the at least one cross-linker compound is present in the ink composition in an amount ranging from about 1 mole % to about 100 mole % with respect to the total cross-linkable sites.

3. The inkjet ink composition of claim 1 wherein the at least one hydrophobic monomer is up to 98 wt % of the monomers;
   wherein the at least one acidic monomer is from about 0.1 wt % to about 30 wt % of the monomers;
   and wherein the at least one crosslinkable monomer is from about 0.1 wt % to about 25 wt % of the monomers and is selected from the group consisting of 2-(methacryloyloxy)ethyl acetoacetate, diacetone acrylamide, and combinations thereof.

4. The inkjet ink composition of claim 1 wherein the at least one cross-linker compound is selected from adipic acid dihydrazide; ethylene diamine; propylene diamine; ethylenediamine; diethylenetriamine; triethylenetetramine; propylenediamine; polyethyleneimine having a molecular weight from about 400 to about 500,000; or combinations thereof; and
   wherein the at least one cross-linker compound does not react with the latex polymer particles in the at least one aqueous solvent.

5. The inkjet ink composition of claim 1 wherein the $T_g$ of the latex polymer particles ranges from about 0° C. to about 75° C., and the latex polymer particles are present in the ink composition from about 1 wt % to about 15 wt %.

6. A method of forming an inkjet ink print, comprising:
   printing the inkjet ink composition of claim 1; and
   forming a crosslinked latex polymer film at least one of as or after the at least one aqueous solvent is depleted from the latex polymer particles after printing, thereby forming the inkjet ink print.

7. The method of claim 6 wherein the at least one cross-linker compound is present in the ink composition in an amount ranging from about 20 mole % to about 80 mole % with respect to the total cross-linkable sites.

8. The method of claim 6 wherein the inkjet ink print exhibits increased durability relative to an inkjet ink print not including a solvent-depleted, crosslinked latex polymer film.

9. The method of claim 8 wherein the increased durability includes an improvement in: highlighter smearfastness; rub resistance; wet smudgefastness; solvent resistance; and combinations thereof.

10. The method of claim 6 wherein the $T_g$ of the latex polymer particles ranges from about 35° C. to about 75° C., and the latex polymer particles are present in the ink composition from about 1 wt % to about 10 wt %.

11. An inkjet printing system, comprising:
    an inkjet fluid ejector fluidically coupled to a reservoir, the reservoir containing an inkjet ink composition of claim 1; and
    the fluid ejector configured to eject the ink composition onto a medium, the ink composition on the medium configured to form a solvent-depleted, crosslinked latex polymer film as the at least one aqueous solvent is depleted from the latex polymer particles after printing.

12. The inkjet printing system of claim 11 wherein the at least one cross-linker compound is present in the ink composition in an amount ranging from about 20 mole % to about 50 mole % with respect to the total cross-linkable sites.

13. The inkjet printing system of claim 11 wherein the $T_g$ of the latex polymer particles ranges from about 35° C. to about 75° C., and the latex polymer particles are present in the ink composition from about 0.5 wt % to about 20 wt %.

14. The inkjet printing system of claim 12 wherein the at least one cross-linker compound is selected from adipic acid dihydrazide; ethylene diamine; propylene diamine; diethylenetriamine; triethylenetetramine; polyethyleneimine having a molecular weight from about 400 to about 500,000; and combinations thereof.

15. The inkjet ink composition of claim 1 wherein the at least one cross-linker compound is selected from adipic acid dihydrazide and polyethyleneimine.

16. The inkjet ink composition of claim 1 wherein the at least one crosslinkable monomer is diacetone acrylamide.

* * * * *